Dec. 29, 1964  J. E. McHUGH, JR  3,162,916
BUCKLE
Filed Jan. 20, 1964
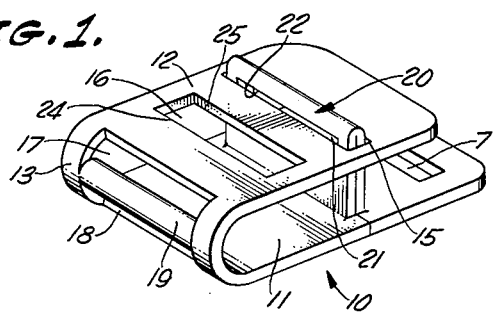
FIG. 1.
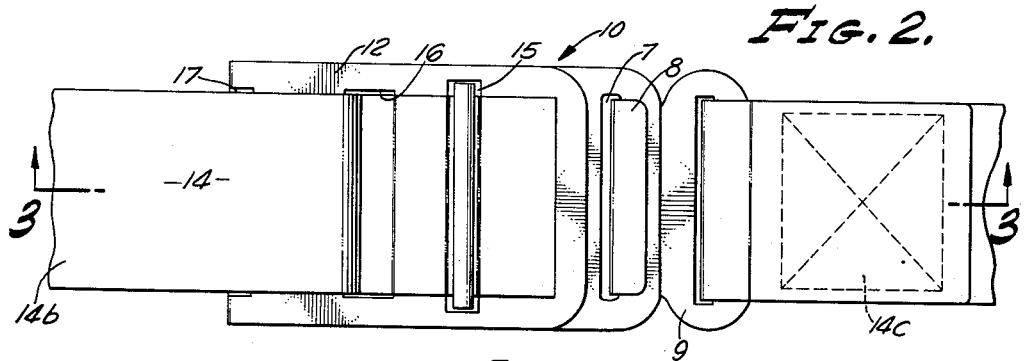
FIG. 2.
FIG. 3.
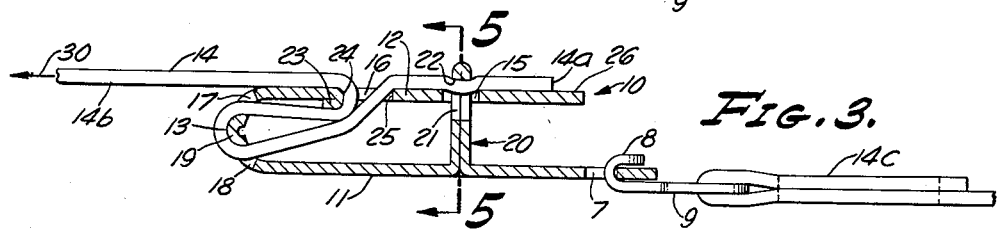
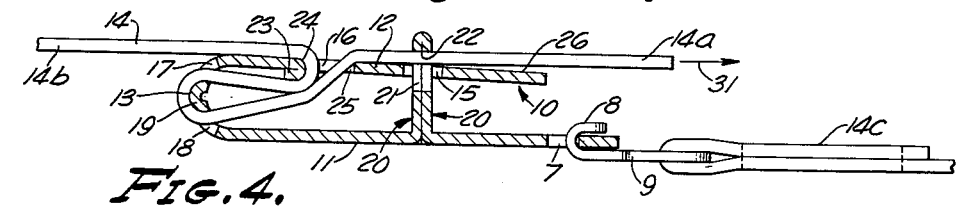
FIG. 4.
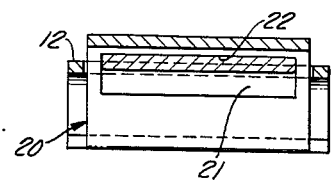
FIG. 5.
INVENTOR.
JOHN E. McHUGH, JR.,
BY Lyon & Lyon
ATTORNEYS

3,162,916
BUCKLE
John E. McHugh, Jr., 4322 Hayvenhurst Ave., Encino, Calif.
Filed Jan. 20, 1964, Ser. No. 338,872
12 Claims. (Cl. 24—198)

This invention relates to an infinitely variable buckle for flat flexible webbing and, in particular, is directed to such a buckle wherein the webbing may be simply pulled through the buckle in one direction but prohibits pulling the webbing in the opposite direction without a separate releasing actuation.

There are numerous types of buckles for flat webbing which permit infinite variations in the gripping or locking point as contrasted to the well known buckle for engaging spaced holes in the webbing which permits only a limited number of variations in the locking point. A common use for these infinitely variable buckles is to permit adjustment of the length of the webbing and then the webbing may actually be coupled and uncoupled by separate means. However, many infinitely variable buckles rely upon the continued tension on the webbing to maintain the locking point and therefore when the tension is released by uncoupling, the adjustment is destroyed. Still other infinitely variable buckles employ serrated members or surfaces for engaging the webbing to prevent slippage or loss of adjustment upon release of the webbing tension, but such a serrated surface or member often causes damage to the webbing after repeated use.

Accordingly, it is an object of this invention to provide an infinitely variable buckle for webbing which permits easy adjustment of the webbing, does not release the webbing upon tension release, and does not employ a web-damaging serrated member or surface. The device of this application is a modification and improvement for use with flat flexible webbing over the device of my United States Letters Patent entitled "Tension-Absorbing Device," No. 2,860,394, issued November 18, 1958, in which ropes, cables, wires, and the like could be used.

Another object of this invention is to provide a novel form of webbing-engaging device wherein a continuous flexible webbing is reeved through the device and tension on the webbing in one direction permits pulling the webbing through the device and in the other direction locks the webbing to the device. Still another object of this invention is to provide such a device wherein the webbing may be unlocked for free pulling in said other direction by mere pressure applied to the device at the appropriate place.

A further object of this invention is to provide a novel form of webbing buckle which is relatively flat and only slightly wider than the webbing and wherein the webbing covers substantially the entire surface of the buckle for producing an esthetically desirable and unique arrangement.

A still further object of this invention is to provide a novel form of infinitely variable gripping device for use with flat flexible webbing which is extremely simple in construction by reason of being comprised of a single piece of appropriately formed metal and yet is highly effective as a readily adjustable tension connector.

Other and more detailed objects and advantages of this invention will appear from the following description and the accompanying drawings, wherein:

FIGURE 1 is a perspective view of the device of this invention with the webbing removed for clarity of illustration.

FIGURE 2 is a plan view of the device of this invention as employed with a flat flexible webbing which may form an apparel belt or the like.

FIGURE 3 is a sectional elevational view taken substantially on the line 3—3 of FIGURE 2 and illustrating the tension-resisting position of the device.

FIGURE 4 is a sectional elevation view similar to FIGURE 3, but illustrating a position caused by tension in the proper direction for merely pulling the webbing through the device. This position is similar to that which may be externally caused for permitting pulling of the webbing through the device in the normally locked direction.

FIGURE 5 is a sectional elevation view taken substantially on the line 5—5 in FIGURE 3.

The buckle device, generally designated 10, of this invention may be constructed in any convenient manner although for economy and simplicity it is preferred to use a single elongated strip as shown in the drawings. The strip may be of any appropriate material having the strength and resiliency required by this construction as will hereafter appear, and various grades of spring steel and types of stainless steels have been found to be completely satisfactory.

In the completed construction of the buckle 10, there is a base portion 11, a top portion 12, and a bent portion 13 joining the base portion and top portion. The bent portion 13 comprises a lateral bend of preferably approximately 180° in a smoothly curved configuration whereby the flat base and top portions 11 and 12 are substantially parallel and extend longitudinally away from the bent portion 13 in the same direction. The base portion 11 and top portion 12 are spaced apart a distance which is appropriate for the particular buckle and for accommodating the particular webbing 14 to be used with that buckle. For example, a buckle used in connection with wearing apparel would probably be of minimum possible thickness whereas thickness may be inconsequential with respect to buckles used on fixture tie-down straps such as on removable car racks and the like. In any event, it is obvious from FIGURES 3 and 4 and the following description that the spacing between top portion 12 and base portion 11 must be greater than twice the thickness of the webbing 14.

The top portion 12 is provided with a pair of non-identical slots 15 and 16. Slot 16 is positioned closer to bent portion 13 and need only be of a lateral length slightly greater than the width of webbing 14, whereas slot 15 must be of a lateral length substantially greater than the width of webbing 14. The bent portion 13 is provided with a pair of laterally extending spaced slots 17 and 18 of a lateral length equal to that of slot 16. It is preferred that the section of the bent portion 13 between slots 17 and 18 be appropriately deformed to form a smooth bar 19 for engaging the webbing 14 and preventing damage to the webbing from sharp edges. It is to be noted that while it is preferred to position slots 17 and 18 in bent portion 13 an equally operable arrangement is obtained if slot 18 is positioned somewhere along the base portion 11 near bent portion 13.

Means are provided on the base portion 11 for cooperating with the top portion 12 in releasably gripping the webbing 14 and, as shown in the drawings, these means may include the clamping element 20. Clamping element 20 extends laterally across base portion 11 and upwardly through slot 15. As previously noted, it is preferred to construct buckle 10 out of a single strip and, therefore, clamping element 20 is comprised of a folded portion of the strip substantially less than the width of the strip and slightly less than the lateral length of slot 15 for protruding through slot 15. Clamping element 20 has a laterally extending and longitudinally facing slot 21 that is of a lateral length slightly greater than the width of webbing 14. At least the upper edge 22 of slot 21 is parallel to base portion 11 and, therefore, is parallel to the upper surface of top portion 12. In the unstressed condition of buckle 10 with the webbing 14 removed, the vertical spacing between edge 22 and the upper surface of top portion 12 may widely vary for various buckles and webbing, but in such condition if edge 22 is above such upper surface the largest that distance would be is slightly less than the thickness of the webbing 14.

The continuous webbing 14 is reeved through the buckle 10 in a manner for obtaining the desired free pulling in one direction and tension-resisting gripping in the other direction. From the free end 14a of the webbing, the webbing 14 passes along the upper surface of top portion 12 through slot 21 and down through slot 16 toward the bent portion 13. The webbing passes outwardly through slot 18, upwardly around bar 19, back inwardly through slot 17 and then outwardly through slot 16 toward the continuing end 14b of the webbing. While it forms no part of this invention except by way of an illustration of a practical use of the device, the continuing end 14b of the webbing may have an end portion 14c connected to a latch 9 having a hook 8 for cooperating with a slot 7 in the base portion 11 whereby a wearing apparel belt or the like is formed which is coupled and uncoupled by latch 9 and adjusted in length by buckle 10. The edge of slot 16 nearest slot 17 is preferably formed by folding back an edge portion 23 to form a smooth corner for passage of the webbing between slots 16 and 17. Slot 16 is of a longitudinally width substantially greater than twice the thickness of the webbing 14 whereas slots 17, 18 and 21 need only be of a width greater than a single thickness of the webbing 14 for permitting free passage of the webbing therethrough. Slot 15 is of a longitudinal width greater than the thickness of clamping element 20 for accommodating same and when associated with a highly flexible webbing 14 the longitudinal width is preferably less than a distance equal to twice the thickness of such webbing plus the thickness of element 20. Thus, the webbing is pinched or clamped between the upper surface of top portion 12 and edge 22 of the clamping element by the upward biasing force of top portion 12 as shown in FIGURE 3. The proper upward biasing force by top portion 12 is obtained by merely bending top portion 12 to the desired location under zero stress conditions with webbing 14 removed.

Referring specifically and by way of comparison to FIGURES 3 and 4, tension applied to the continuing end 14b of the webbing in the direction of arrow 30 will result in a counterclockwise turning moment being applied to upper portion 12 through the engagement of the webbing with edge 24 of slot 16 thereby increasing the clamping force on the webbing between the upper surface of top portion 12 and the edge 22 of the clamping element. This increased clamping force together with the substantial friction developed between the webbing and the edges of slots 16, 17 and 18 efficiently resist the tension force in the direction of arrow 30. When it is desired to tighten-up or foreshorten the continuing end 14b of the webbing (such as in tightening the adjustment of the wearing apparel belt illustrated), tension is merely applied to free end 14a in the direction of arrow 31 which will result in pulling the webbing 14 through the buckle 10 in that direction. Tension in the direction of arrow 31 causes releasing of the clamping or gripping between edge 22 and the upper surface of top portion 12 by both tending to straighten the webbing passing through slot 21 and, more significantly, applying a clockwise turning moment to top portion 12 by means of the engagement of the webbing with edge 25 of slot 16 to depress top portion 12 toward base portion 11 thereby releasing the gripping of the latch element 20. It has been found that an adequate tension-resisting friction is developed in the interengagement between webbing 14 and edges 24 and 25 and bar 19 to produce this overturning moment force even though continuing end 14b is unrestrained. If it is desired to release the clamping of buckle 10 such as for lengthening the continuing end 14b, then it is merely necessary to manually depress the extension portion 26 of the top portion 12 toward the base portion 11 to produce the relative relationship illustrated in FIGURE 4 (or even a freer relationship), and then to apply tension on the continuing end 14b in the direction of arrow 30 to pull the webbing through the buckle.

Thus, it may be seen that my illustrated and aforedescribed invention efficiently and economically accomplishes the numerous desired objects set forth above. Having fully described my invention it is to be understood that I do not wish to be limited to the details herein set forth or to the details illustrated in the drawings, but my invention is of the full scope of the appended claims.

I claim:

1. In a buckle for use with a flexible flat webbing, comprising: resiliently joined and spaced base and top portions extending longitudinally, there being a lateral slot in said top portion, a clamping element on said base portion extending laterally across and upwardly through said lateral slot, there being a lateral slot in said clamping element, there being a second lateral slot in said top portion, there being a pair of spaced lateral slots spaced from said clamping element in the direction of and below said second lateral slot, and said top portion biased away from said base portion for engaging and gripping webbing passing longitudinally through said clamping element slot above said top portion with the webbing passing down through said second lateral slot, out and back in through the said pair of space slots, and out through said second lateral slot.

2. In a buckle for use with a flexible flat webbing, comprising: base and top portions joined at one end for resilient flexure therebetween and the juncture, there being a lateral slot in said top portion, a clamping element on said base portion extending laterally across and upwardly through said lateral slot, there being a slot in said clamping element, there being a second lateral slot in said top portion between said juncture and the first said lateral slot, there being a pair of spaced lateral slots at said juncture and below said second lateral slot, and said top portion biased away from said base portion for engaging and gripping the webbing passing longitudinally through said clamping element slot above said top portion with the webbing extending longitudinally to and passing down through said second lateral slot, out and back in through the said pair of spaced slots, and out through said second lateral slot.

3. In a buckle for use with a flexible flat webbing, comprising: spaced and substantially parallel base and top portions resiliently connected and extending longitudinally from said connection for flexure therebetween there being a lateral slot in said top portion spaced from said connection, a clamping element on said base portion extending laterally across and upwardly through said lateral slot, there being a slot in said clamping element with an upper edge substantially parallel to said top portion, there being a second lateral slot in said top portion between said connection and the first said lateral slot, there being a pair of spaced lateral slots in said buckle located below and beyond said second lateral slot in the direction away from said clamping element, and said top portion normally biased away from said base portion for engaging and gripping the webbing passing longitudinally through said clamping element slot above said top portion and from there the webbing passing down through said second lateral slot, out and back in through the said pair of spaced slots, and back out through said second lateral slot.

4. The combination of claim 3 wherein said first lateral slot in said top portion is of a longitudinal width greater than the longitudinal thickness of said clamping element and less than twice the webbing thickness plus said clamping element thickness for cooperating with said clamping element for gripping by pinching webbing.

5. In a buckle for use with a flexible flat webbing, comprising: an elongated resilient strip having a bent portion extending laterally across the width of said strip for forming a connection between spaced base and top portions of said strip extending longitudinally from said bent portion, there being a lateral slot in said top portion spaced from said bent portion, a clamping element on said base portion extending laterally across and upwardly through said lateral slot, there being a lateral slot in said clamping element, there being a second lateral slot in said top portion between said bent portion and the first said slot, there being a pair of spaced lateral slots in said strip below said second lateral slot, and said top portion biased away from said base portion for engaging and gripping the webbing passing longitudinally through said clamping element slot above said top portion with the webbing then passing down through said second lateral slot, out and back in through the said pair of spaced slots, out through said second lateral slot and longitudinally away from the buckle.

6. In a buckle for use with a flexible flat webbing, comprising: an elongated resilient strip having a bent portion extending laterally across the width of said strip for forming a connection between base and top portions of said strip extending longitudinally from said bent portion in the same longitudinal direction, there being a lateral slot in said top portion substantially spaced from said bent portion, a clamping element on said base portion extending laterally across and upwardly through said lateral slot, there being a longitudinally facing and laterally extending slot in said clamping element with an upper edge relatively parallel to said top portion, there being a second lateral slot in said top portion betwen said bent portion and the first said slot, there being a pair of spaced lateral slots in said bent portion, and said top portion biased away from said base portion for engaging and gripping webbing passing longitudinally through said clamping element slot above said top portion with the webbing then passing down through said second lateral slot, out and back in through the said pair of spaced slots in said bent portion, out through said second lateral slot, and longitudinally away from the clamping element.

7. In a buckle for use with a flexible flat webbing, comprising: an elongated resilient strip having a substantially 180° bent portion extending laterally across the width of said strip for forming spaced and relatively parallel base and top portions of said strip extending longitudinally from said bent portion, there being a lateral slot in said top portion substantially spaced from said bent portion, a clamping element on said base portion extending laterally across and upwardly through said lateral slot, there being a longitudnally facing and laterally extending slot in said clamping element with an upper edge substantially parallel to said top portion, there being a second lateral slot in said top portion between said bent portion and the first said slot, there being a pair of spaced lateral slots in said strip below said second lateral slot and bent portion, spaced from said clamping element on the same side as said second lateral slot, and said top portion biased away from said base portion for engaging the webbing passing longitudinally through said clampng element slot above said top portion and with the webbing then passing down through said second lateral slot, out and back in through the strip through said pair of spaced slots, out through said second lateral slot, and longitudinally away for free pulling of the webbing from the end passing away from said clamping element with clamping against pulling the webbing from second lateral slot.

8. In an infinitely variable web buckle device, the combination of: resiliently joined and spaced base and top portions extending longitudinally, there being a lateral slot in said top portion, a clamping element on said base portion extending laterally across and upwardly through said lateral slot, there being a slot in said clamping element, there being a second lateral slot in said top portion, there being a pair of spaced lateral slots spaced from said clamping element in the direction of and below said second lateral slot, said top portion normally biased away from said base portion beyond said clamping element slot, and a flat flexible webbing passing longitudinally over the upper surface of said top portion and through said clamping element slot to depress the top portion toward the base portion; said webbing passing from said clamping element in through said second lateral slot, out through and back in through said pair of spaced slots, back out through said second lateral slot, and longitudinally away in the direction away from said clamping element.

9. In an infinitely variable web buckle device, the combination of: spaced and substantially parallel base and top portions resiliently connected and extending longitudinally from said connection for flexure therebetween, there being a lateral slot in said top portion spaced from said connection, a clamping element on said base portion extending laterally across and upwardly through said lateral slot, there being a slot in said clamping element with an upper edge substantially parallel to said top portion, there being a second lateral slot in said top portion between said connection and the first said lateral slot, there being a pair of spaced lateral slots in said buckle located below and beyond said second lateral slot in the direction away from said clamping element, said top portion normally biased away from said base portion beyond said clamping element slot, and a flat flexible webbng passing longitudinally over the upper surface at said top portion and through said clamping element slot to depress the top portion toward the base portion; said webbing passing from said clamping element in through said second lateral slot, out through and back in through said pair of spaced slots, back out through said second lateral slot, and longitudinally away in the direction away from said clamping element.

10. The combination of claim 9 wherein said first lateral slot in said top portion is of a longitudinal width greater than the longitudinal thickness of said clamping element and less than twice the webbing thickness plus said clamping element thickness for cooperating with said clamping element for gripping by pinching webbing.

11. In a buckle device, the combination of: an elongated resilient strip having a substantially 180° bent portion extending laterally across the width of said strip for forming spaced and relatively parallel base and top portions of said strip extending longitudinally from said bent portion, there being a lateral slot in said top portion substantially spaced from said bent portion, a clamping element on said base portion extending laterally across and upwardly through said lateral slot, there being a longitudinally facing and laterally extending slot in said clamping element with an upper edge substantially parallel to said top portion, there being a second lateral slot in said top portion between said bent portion and the first said slot, there being a pair of spaced lateral slots in said bent portion, said top portion normally biased away from said base portion beyond said clamping element slot, and a flat flexible webbing passing longitudinally over the upper surface of said top portion and through said clamping element slot to depress the top portion toward the base portion; said webbing passing from said clamping element in through said second lateral slot, out through and back in through said pair of spaced slots, back out through said second lateral slot, and longitudinally away in the direction away from said clamping element.

12. In a buckle for use with a flexible flat webbing to be reeved therethrough, comprising: an elongated strip of spring steel having a substantially 180° bent portion extending laterally across the width of said strip for forming spaced and relatively parallel base and top portions of said strip extending longitudinally from said bent portion, there being a lateral slot in said top portion substantially spaced from said bent portion, a clamping element on said base portion extending laterally across and upwardly through said lateral slot, there being a longitudinally facing and laterally extending slot in said clamping element with an upper edge substantially parallel to said top portion, there being a second lateral slot in said top portion between said bent portion and the first said slot, and there being a pair of spaced lateral slots in said bent portion.

References Cited in the file of this patent

UNITED STATES PATENTS

| | | |
|---|---|---|
| 1,334,624 | Martin | Mar. 23, 1920 |
| 2,860,394 | McHugh | Nov. 18, 1958 |